United States Patent
Liu et al.

(10) Patent No.: US 7,420,989 B2
(45) Date of Patent: Sep. 2, 2008

(54) TECHNIQUE FOR IDENTIFYING BACKUP PATH FOR SHARED MESH PROTECTION

(75) Inventors: Hua Autumn Liu, Ottawa (CA); Ajay Sathyanath, Woodbridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 623 days.

(21) Appl. No.: 10/955,109

(22) Filed: Sep. 30, 2004

(65) Prior Publication Data
US 2006/0067210 A1    Mar. 30, 2006

(51) Int. Cl.
*H04J 3/22* (2006.01)
(52) U.S. Cl. .................... 370/468; 370/217; 370/252
(58) Field of Classification Search ......... 370/216–221, 370/225–228, 252, 253, 468
See application file for complete search history.

(56) References Cited

U.S. PATENT DOCUMENTS

| | | | |
|---|---|---|---|
| 6,324,162 B1 * | 11/2001 | Chaudhuri | 370/225 |
| 6,449,248 B1 * | 9/2002 | Trasatti et al. | 370/216 |
| 6,992,978 B1 * | 1/2006 | Humblet et al. | 370/228 |
| 2003/0028641 A1 * | 2/2003 | Zhang et al. | 709/226 |
| 2004/0042402 A1 * | 3/2004 | Galand et al. | 370/237 |
| 2004/0246892 A1 * | 12/2004 | Elie-Dit-Cosaque et al. | 370/216 |

* cited by examiner

*Primary Examiner*—Ricky Ngo
*Assistant Examiner*—Gary Mui (57) ABSTRACT

The Resource Reservation Protocol (RSVP) is to gather outgoing interface identification information (e.g., outgoing interface ID's or IP addresses) for each node in a primary path. This information is "recorded" in an opaque object (referred to herein as the "RECORD PRIMARY PATH" or "RPP" object). In accordance with the present invention, the information contained in the opaque object is stored in two databases for each node, with local interface information of a particular node being stored in its Local Links Database (LLDB), and information identifying the primary links that affect the backup bandwidth calculation for that node being stored in its External Links Database (ELDB). Each node has its own LLDB and ELDB (or has the LLDB and ELDB data stored in a larger database in such a way that it is can be separately accessible on a node-by-node basis) so that, for each node, the information can be obtained and used. The admission controller at each node in the primary path uses the data in the LLDB and ELDB to compute the exact (least) amount of bandwidth required to be reserved on every link of the primary path.

15 Claims, 5 Drawing Sheets

TECHNIQUE FOR IDENTIFYING BACKUP PATH FOR SHARED MESH PROTECTION

TECHNICAL FIELD

The present invention relates generally to the filed of self-healing networks.

BACKGROUND

Computer networks are an established part of everyday life. Most medium to large businesses, and even many small businesses, have some form of network established within the office and which connects with other networks in other offices, for example, via the Internet. Further, it is becoming more and more common for homeowners to establish networks within their residence to interconnect multiple computer stations and to connect to the Internet.

Generally, a typical network connection comprises a path between a source (e.g., a PC configured with a software client) and a destination (e.g., a network server), referred to herein as a "source-destination pair". There are typically multiple potential paths between the source and destination, with the optimal path for a connection between a particular source-destination pair referred to herein as the "primary path" or the "primary LSP". Alternate routes between the same source-destination pair, which may be many, are referred to herein as "backup paths" or "protection LSPs".

Restoration of network connections, and the ability to create "self-healing" network connections, are a major and growing concern for today's network and network administrators. Restoration is the ability of a network to re-route traffic from one path (typically the primary path) between a source-destination pair, to another path (a backup path) between the same source-destination pair. These reroutes are desirable in the event of a failure. The new path to which traffic is switched is called the restored or back-up path, and may be precomputed (i.e., determined by pre-analysis of the possible network connections and a predetermination of backup paths to be used if needed) or dynamically computed (calculated "on the fly" based on an instantaneous analysis of the available paths at the time of the failure).

There are several known types of restoration schemes, each of which has pros and cons. Two of the more common restoration schemes are the dedicated mesh (1+1) protection and the shared mesh (1:N) restoration schemes. Dedicated mesh protection provides fast recovery, since there is a dedicated backup path allocated for each primary path. In the event of a failure, the failed portion of the primary path is simply switched out of the network connection in favor of the dedicated secondary path provided for that link of the primary path.

Shared mesh restoration allocates a single restoration path that is shared among multiple (N) network links. Compared to dedicated mesh protection, shared mesh restoration allows considerable saving in terms of the capacity required to provide the protection. In addition, the backup resources can be utilized for lower priority preemptable traffic in normal network operating mode, that is, the backup paths may be used to carry live revenue generating traffic, with the understanding that such traffic may be bumped off if there is a failure somewhere in the network, and that particular path is needed for restoration. In view of the ability to utilize a single path to provide protection for multiple network links, the use of shared mesh restoration has become the preferred method where low cost and/or reduced component size is an issue.

In a shared mesh restoration scheme (1:N) there are N primary paths that share one path for their backup. For example, a set of links in the network can act as a backup route for N different primary paths, even where the N different primary paths do not correspond to the same source-destination pair. From the perspective of individual links L (also referred to as "segments") in a backup path, each link 'L' is only "aware" of the primary paths for which it provides protection, and has no awareness of the primary paths for which other links similar to 'L' within the same backup path provide protection.

Primary paths and backup paths typically comprise multiple links connecting the multiple nodes in the primary or backup path. Links in the primary path are referred to herein as "primary links" and links in the backup path are referred to herein as "backup links." When multiple parallel primary paths (i.e., primary paths with no common links) share a single backup path, the backup path need only reserve as much bandwidth as that required by the primary path carrying the largest bandwidth. However, since the paths (primary or backup) are made up of multiple links, this bandwidth determination is made on a link-by-link basis. The backup bandwidth necessary to be reserved for a particular backup link L, given by '$B_L$' is given by Equation (1):

$$B_L = \text{MAX}(\Sigma_{i=1}^{K_j} F_{i,j})_{j=1}^{j=N}$$

where, $F_{i,j}$=bandwidth of path i, on primary link j, $K^J$=number of paths on link j Each link L "belongs" to a certain node in the network for the purpose of scheduling traffic, that is, scheduling is performed based on the outgoing interface of a link, and there is only one outgoing interface with respect to one node and a given link. Thus, for each node, the various $K^j$'s (number of paths K on a particular primary link j) must be computed for each link L belonging to that node. The prior art approach for performing this computation has been to use extensions to OSPF/OSPF-TE. By using opaque LSAs (Link State Advertisements), each node transmits and maintains information about the number of primary links in the network whose backup path constitutes a link L in the network. In other words, every transmitting node T in the network transmits/floods opaque LSAs to every other node, so as to provide information about all primary paths across all of its interfaces. A receiving node R, in order to perform the backup bandwidth computation, goes through the entire LSA database to search for all relevant primary paths that affect the computation for a local link L.

The methodology described above is cumbersome because it requires that several messages be sent through the network to identify and obtain the various backup path possibilities. Moreover, the information might not always be fresh, since in OSPF, messages/LSAs have only a certain finite refresh frequency. When a particular path is calculated by a general protocol, in this case OSPF, the reservation procedures try to reserve the required amount of bandwidth. However, if the information distributed by OSPF is stale, an "undo" procedure is required. This undo procedure is called a crankback. With OSPF, only after the reservation is made is it possible to know for sure the actual amount of bandwidth that is required, and hence that a crankback might be needed, because the reservation may have taken more than the calculated bandwidth, and hence a new backup path would be tried that is equal or closer to the calculated bandwidth.

Further, the sharing information database must be replicated (as part of the LSA database), even if all of the nodes do not require the entire database (only those primary links which affect a particular backup link 'L' are needed for the calculation, i.e., a node only needs the information about the primary links across all of its interfaces/links, and not all the links in the network). This is because OSPF is a distributed or "flooding" protocol, and thus distributes all of the information about all links in the network, whether they are needed or not. This is overkill in both resources (e.g., memory), and CPU usage. In addition to increasing the memory overhead, using OSPF also increases the computation overhead, since the search through the database is comprehensive. In other words, to solve equation (1), OSPF determines $K^J$'s for all J's, and $F_{i,j}$ for every i and every j, for each and every node. Much of this computation is unnecessary for the goal of identifying the optimal backup paths; however, using OSPF, it cannot be avoided.

Accordingly, it would be desirable to have a technique for calculating the optimal backup path(s) for a network whereby the data used to perform the calculation is always fresh; where every node in the network maintains only as much information as is needed to make the calculation; and where a minimum number of nodes are used in synchronizing the distributed database.

SUMMARY

The present invention utilizes the Resource Reservation Protocol (RSVP) to gather outgoing interface identification information (e.g., outgoing interface ID's or IP addresses) for each node in a primary path. This information is "recorded" in an opaque object (referred to herein as the "RECORD PRIMARY PATH" or "RPP" object). In accordance with the present invention, the information contained in the opaque object is stored in two databases for each node, with local interface information of a particular node being stored in its Local Links Database (LLDB), and information identifying the primary links that affect the backup bandwidth calculation for that node being stored in its External Links Database (ELDB). Each node has its own LLDB and ELDB (or has the LLDB and ELDB data stored in a larger database in such a way that it is can be separately accessible on a node-by-node basis) so that, for each node, the information can be obtained and used. The admission controller at each node in the primary path uses the data in the LLDB and ELDB to compute the exact (least) amount of bandwidth required to be reserved on every link of the primary path.

The information obtained from the opaque object and stored in the LLDB and ELDB allows the determination of the amount of sharing that is possible with the existing potential backup paths. The admission controller needs reservation information only for links that are part of potential backup paths, and reservation information for links that are not part of any potential backup paths is not sought and thus disregarded. A determination is then made, from among these links only, which path is best suited (i.e., which path requires the least amount of reservation processing) to serve as the backup path for the particular primary path under scrutiny. Maintaining minimal reservation information for potential backup paths leads to more efficient usage of the network.

DETAILED DESCRIPTION

Figure 1:
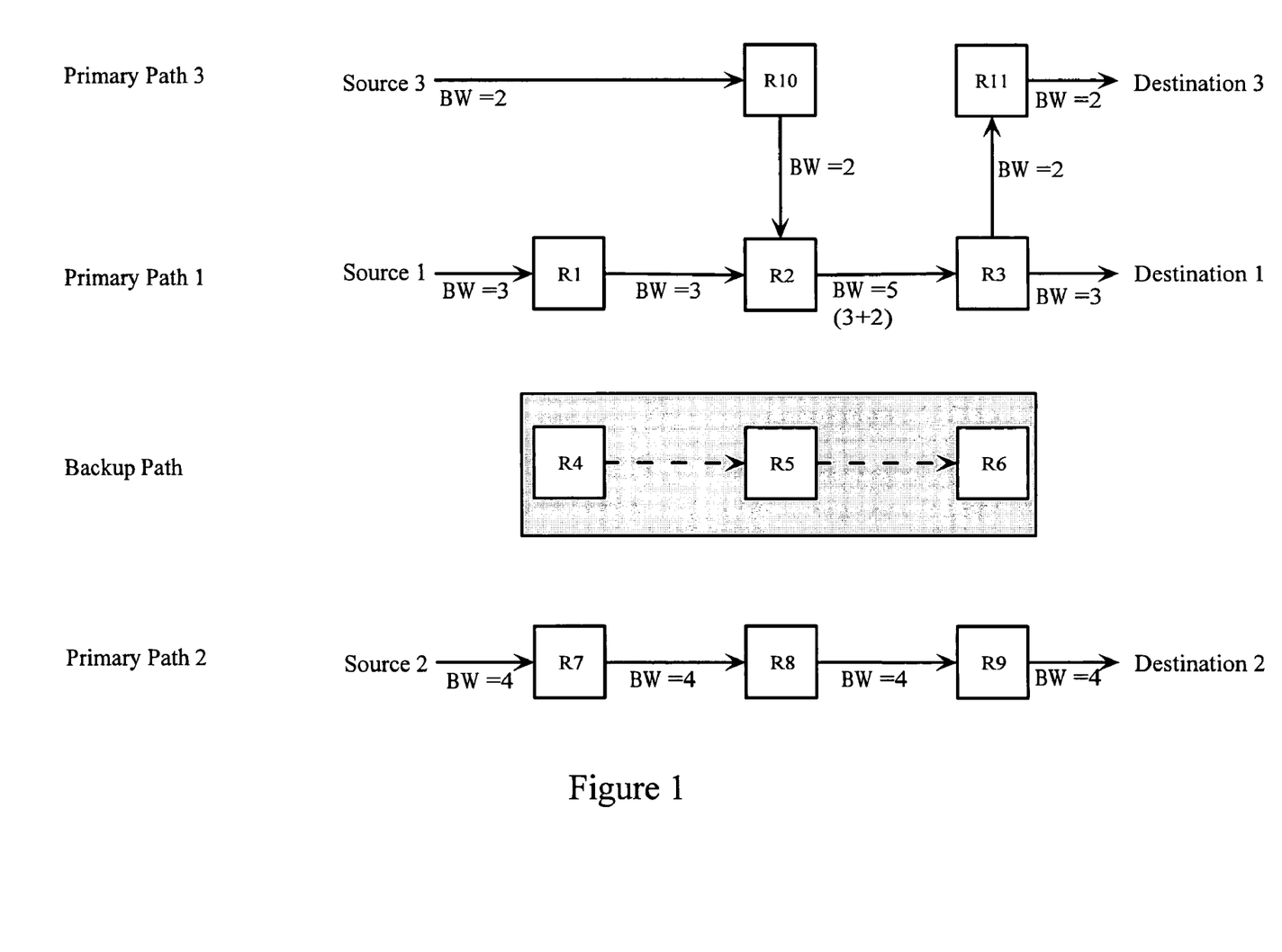
FIG. 1 illustrates a typical series of network nodes interconnected to form, in this example, three primary paths.

FIG. 1 illustrates a typical series of network nodes interconnected to form, in this example, three primary paths. Traffic flows along a first primary path (Primary Path 1) between Source 1 and Destination 1, formed by the interconnection of nodes R1-R2-R3. Traffic flows along a second primary path (primary path 2) between Source 2 and Destination 2, formed by the interconnection of nodes R7-R8-R9. Finally, traffic flows along a third primary path (Primary Path 3) between Source 3 and Destination 3, formed by the interconnection of nodes R10-R2-R3-R11. As can be seen, Primary Path 3 shares a portion of Primary Path 1, more specifically, the link between node R2 and node R3.

Figure 2:
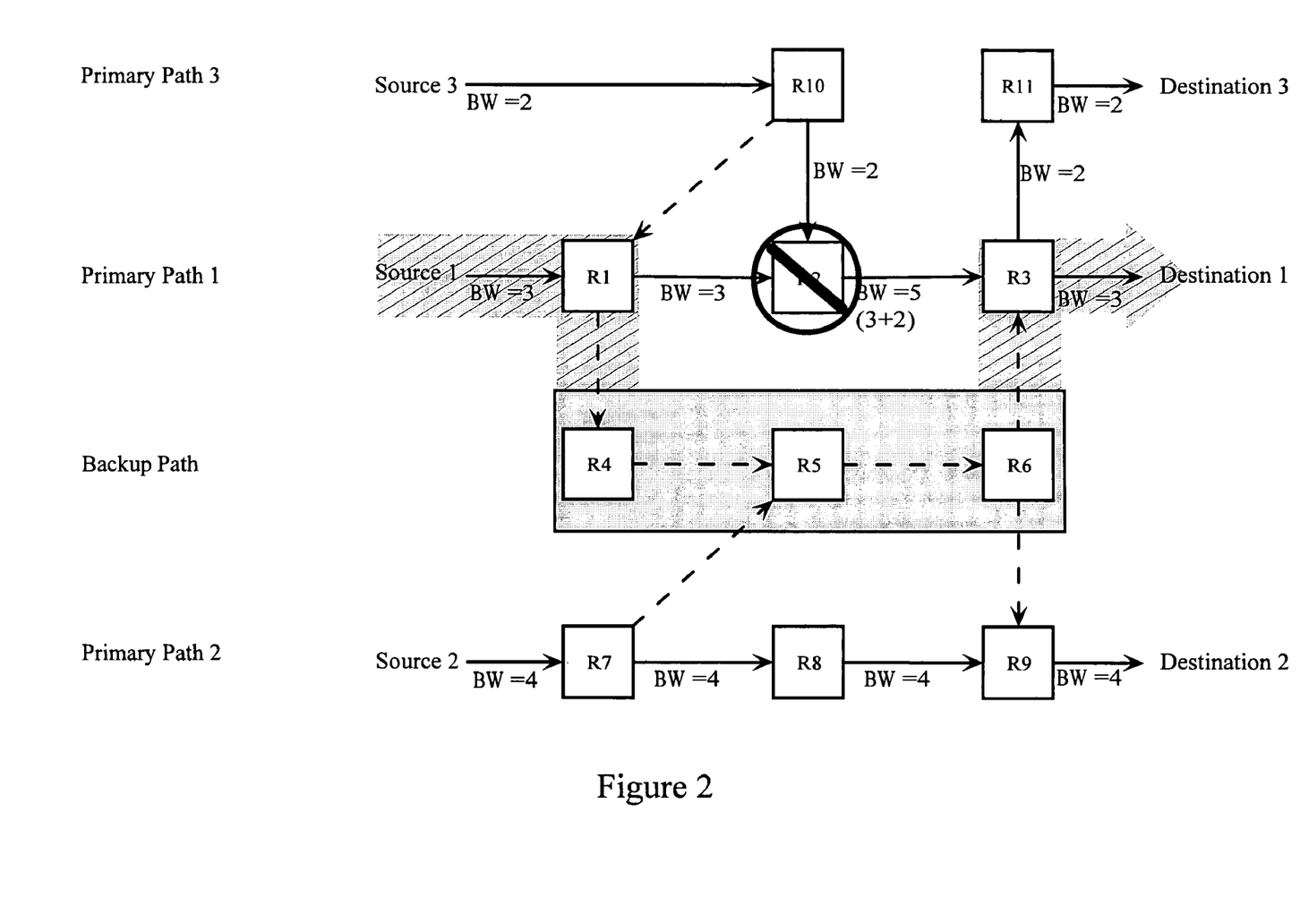
FIGS. 2-4 illustrate the operation of the shared mesh restoration system shown in FIG. 1.
Figure 3:
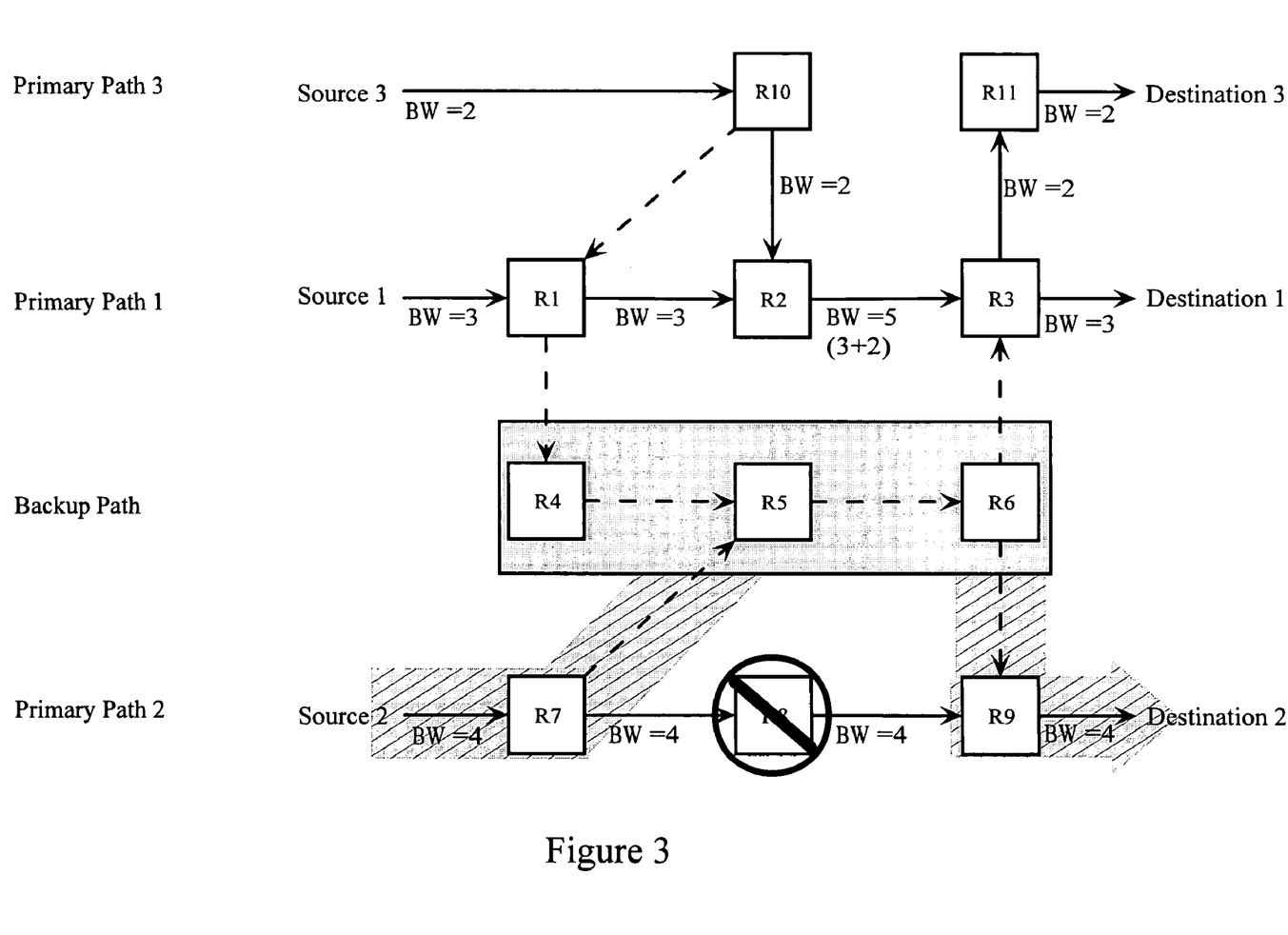
Figure 4:
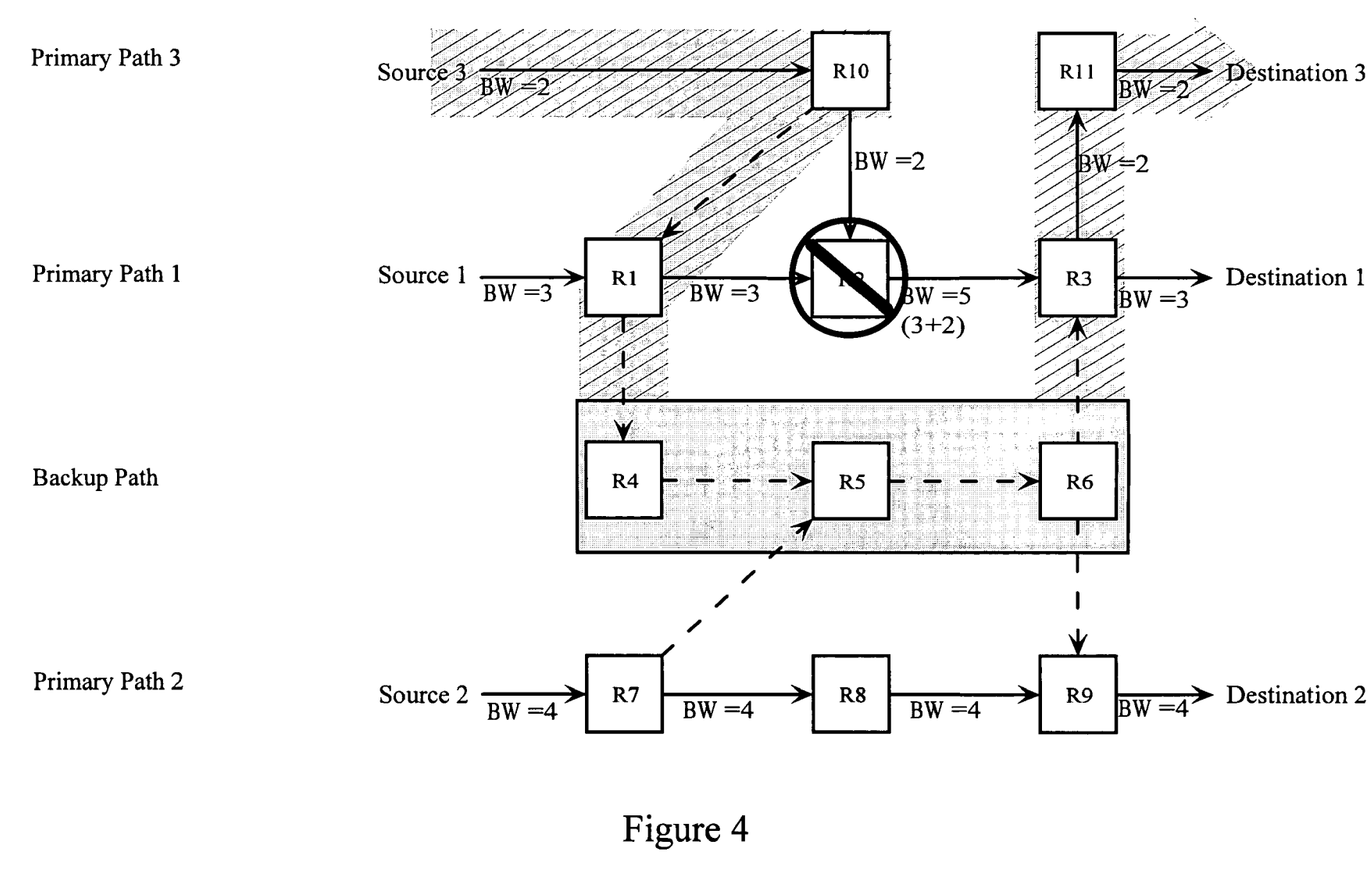

A back-up path comprised of the interconnection of nodes R4-R5-R6 is also shown. In a typical shared mesh restoration arrangement, a single point or node failure is assumed. Primary Paths 1 and 2, which are mutually diverse, can share this back-up path in situations where there is a node failure along one of the primary paths. The operation of the shared mesh restoration system shown in FIG. 1 is illustrated in FIGS. 2-4. Referring to FIG. 2, if node R2 suffers a failure, traffic destined for Primary Path 1 (R1-R2-R3) can be diverted by switching node R1 to connect with node R4, and switching node R6 to connect with node R3. This creates the back-up path illustrated by the shaded portion of FIG. 2, whereby the traffic now flows along the back-up path R1-R4-R5-R6-R3 between Source 1 and Destination 1.

Similarly, referring to FIG. 3, if there is a failure of node R8 in Primary Path 2, node R7 can be switched to direct the flow of traffic destined for Primary Path 2 to instead flow up to node R5 in the back-up path, and node R6 can be switched to direct traffic flow to node R9. Thus, the traffic now flows along a back-up path between Source 2 and Destination 2 along the path R7-R5-R6-R9, illustrated by the shaded portion of FIG. 3.

Finally, referring to FIG. 4, in the event of a failure of node R2, traffic destined for Primary Path 3 can be diverted by switching node R10 to direct traffic flow to node R1, and switching node R1 to direct traffic flow to node R4, and switching node R6 to direct traffic to node R3. This causes the traffic to flow along the back-up path for Primary Path 3, that is, along the shaded route R10-R1-R4-R5-R6-R3-R11.

Each of the primary paths is designed to carry a particular bandwidth load between their respective source and destinations. Referring back to FIG. 1, the maximum capacity required for Primary Path 1 between Source 1 and Destination 1 is shown as 3 units (for example 3 mbps or 3 kbps); Primary Path 2 is shown as requiring a maximum capacity of 4 bandwidth units between Source 2 and Destination 2; and Primary Path 3 is shown as requiring a maximum capacity of 2 bandwidth units between Source 3 and Destination 3.

The maximum bandwidth required for each link of the network (a segment or link is defined as a direct connection between one node and another node, e.g., a connection between R1 and R2; a connection between R2 and R3; a connection between R3 and R11; etc.) is cumulative when two or more paths share a common link. Basically, bandwidth capacities must be reserved in advance for each link to cover the maximum potential capacity requirements for each link. These maximum required reservation capacities are included in FIG. 1 as indicated by the bracketed bandwidth numbers appearing between the nodes. For example, between nodes R1 and R2, a designation "{BW=3}" indicates that the flow between node R1 and R2 will never exceed three units of bandwidth in a typical situation where the network is functioning properly. The flow between node R2 and node R3 could potentially require five units of bandwidth, since node R2 could be receiving three units of bandwidth from node R1 and simultaneously receiving two units of bandwidth from node R10, and directing them to node R3. Thus, the maximum reservation capacity between nodes R2 and R3 is shown as {BW=5}.

The back-up path R4-R5-R6 must also be able to handle the maximum capacity necessary in the event of a single node failure. Consider, for example, a failure of node R2. As shown in FIG. 2, in the event of a failure of node R2, flow along Primary Path 1 is diverted, via back-up path R4-R5-R6, along the path R1-R4-R5-R6-R3. In addition, referring to FIG. 4, if node R2 fails, flow along Primary Path 3 will be diverted along the back-up path R4-R5-R6, along the path R10-R1-R4-R5-R6-R3-R11. In this case, with node R2 inoperative, the path R1-R4-R5-R6-R3 is shared by traffic flowing along both Primary Path 1 and Primary Path 3. This means that the segments making up the shared portion of the path must be able to accommodate a capacity that is equal to the combined maximum capacities along Primary Path 1 and Primary Path 3, that is, 5 bandwidth units.

The overall concept behind the present invention is to identify each node in a primary path; identify any alternative paths (disjoint from the primary path) that are capable of providing a backup path for the primary path; determine the presently allocated bandwidth and bandwidth capacity for each segment in the potential backup paths only; and then decide which among the potential backup paths is optimal, taking into consideration multiple factors including, for example, administrative weight, cost, delay, jitter, etc.

Figure 5:
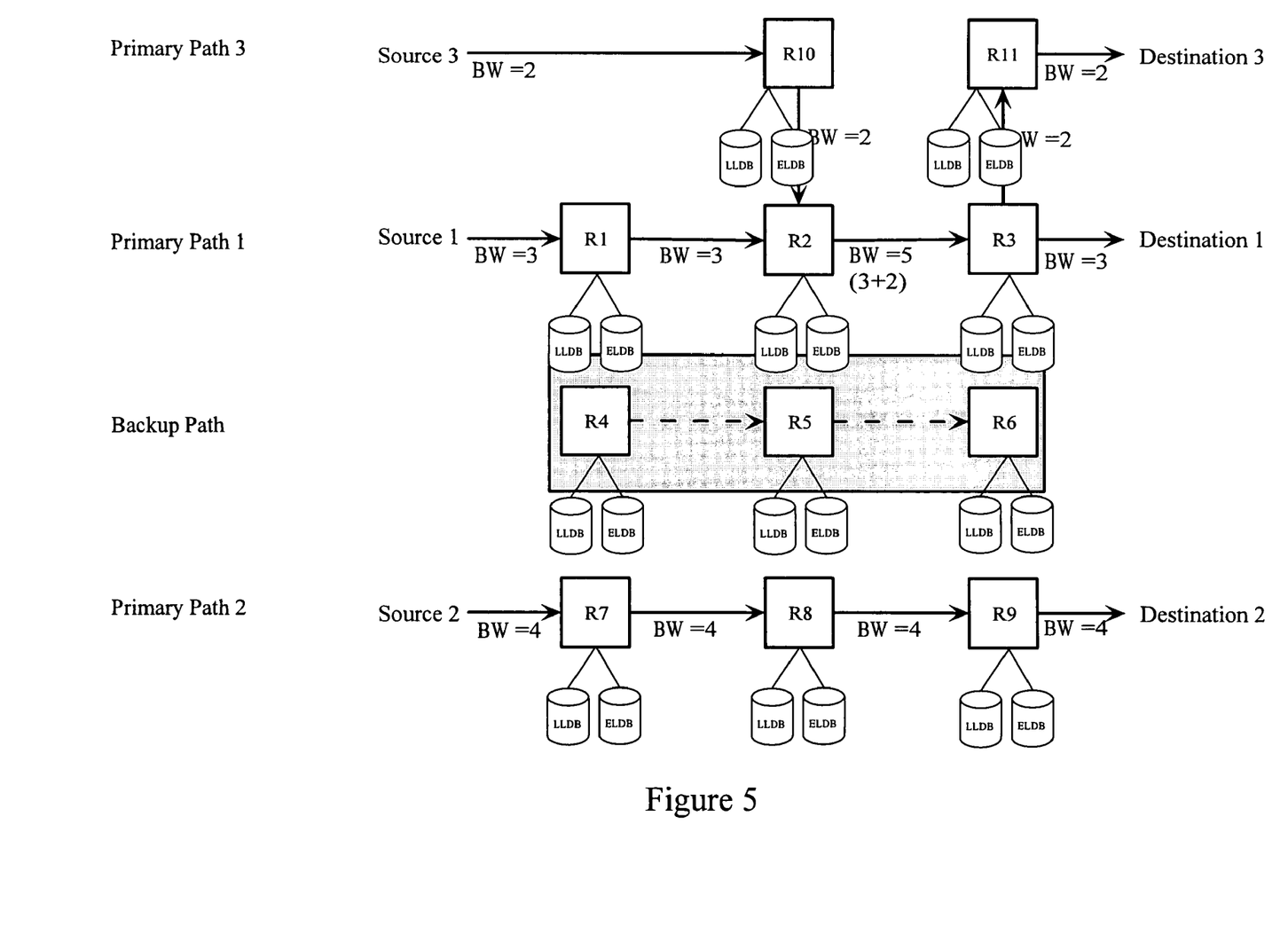
FIG. 5 is a block diagram illustrating and example of a configuration for implementation of the LLDB and ELDB in accordance with the present invention.

In accordance with the present invention, the information needed to make these determinations is stored in individual databases local to each node. As shown in FIG. 5, each node has associated therewith a Local Links Database (LLDB) and an External Links Database (ELDB). These databases and their function are described in more detail below. It is understood that the configuration illustrated in FIG. 5 illustrates a simple exemplary configuration and that any configuration which would enable the separate storage or partitioning of data, on a node by node basis as illustrated, can be utilized and still fall within the scope of the present invention.

The source and destination nodes are known, and from the graph of the network various parallel paths between this given source and destination node can be computed using any known method. One of these parallel paths, based on cost or administrative weight, is chosen as the primary path. The remaining paths comprise a set of parallel paths that are potentially the new backup path for the selected primary path.

In accordance with the present invention, while establishing the primary path, RSVP uses the Explicit Route Object (ERO) in a "path message" (a "path message" is a message containing the source node ID that is sent by RSVP towards the destination ID) to enable it to reach the destination node along the pre-computed path. Simultaneously, RSVP uses the Record Route Object (RRO) also in the path message, to collect the node ID's of each node in the primary path. The RRO is also utilized to determine the presence of routing loops, if any. This prevents the infinite circulation of packets transmitted in the network, which happens, for example, when the next hop of a node A is B, and that of node B is A. In other words, in such a situation, when packets reach A they will be transmitted to B, and when packets reach B they will be transmitted to A, thus preventing packets from actually leaving the loop A-B.

A router has many interfaces via links that connect to other routers or nodes in the network. The "outgoing interface" is the IP address, or interface index, of a particular interface. This particular interface is involved in sending data or traffic out of the router for a particular path, and is hence called the outgoing interface for a particular path.

The outgoing interface is obtained by making calls to an existing interface manager, or a local routing table. All routers have a routing table and an interface manager, which keeps track of the local interfaces in the router and their connection points. In order to route packets from a source to destination, the router looks into the packet to determine the destination, and then tries to match that entry with one of the entries in its routing table. If there is a match, the appropriate outgoing interface for that entry is picked up and the packet is sent along that outgoing interface.

Once the path message arrives at the destination node, a RESV message is passed back to the source node to confirm the reservation of the bandwidth and/or the state (active/inactive) of a particular path. At the same time, a "reverse path message" (a path message sent from destination to source) is initiated and sent back to the source node using an ERO, whose explicit route was determined by the RRO of the initial path message. This reverse path message is needed to enable bi-directional flows. Once the two pairs of path and RESV messages are completed, the primary path is considered complete, which means that packets can now be sent from source to destination and destination to source. RSVP then packages the opaque object (which contains both the node ID's and the outgoing interfaces) into a message and the information contained in the opaque object for each node is stored in the Local Links Database (LLDB) and External Links Database (ELDB) for each node. The admission controller in the source node can then use this information to verify the creation of the primary path.

The LLDB is a database containing all the local interfaces of a particular node. Against every interface is maintained the bandwidth capacity of that link, the present bandwidth used up, a high water mark for the bandwidth, and the amount of bandwidth which is used up as secondary or backup path (in other words, protection bandwidth). The LLDB also maintains a list called the primary links. Every entry in the primary links list provides a pointer or a reference to the ELDB, the number of flows that are protected by that primary link, and the amount of bandwidth consumed by the cumulative effect of those flows. This allows for the association of the primary flows that affect the computation of the backup link.

When RSVP calls the admission controller to create the backup path, it also provides the list of outgoing interfaces (collected as described earlier) of the primary path. The admission controller adds this list into the LLDB every time RSVP makes a call to create a backup path. By referring to the LLDB, the admission controller can find out all the primary links that affect the calculation of the bandwidth required by the backup path (links). In other words the various 'J's in equation (1) above, which determine the MAX backup bandwidth, are obtained.

The ELDB is a database that contains a list of all of the primary links that affect the secondary/backup bandwidth calculation of every interface in a particular node. In other words, if a node has 6 interfaces, each of which supports secondary/backup paths, then the ELDB would be constituted by only those primary links that affect each of those 6 interfaces, nothing more and nothing less. These primary links would mostly belong to other nodes in the network, however a small number of primary links could also belong to the same local node. It is classified as an external links database because even the primary links (interface) that belong to the local node would be for a different interface within the same node. Against every entry (link) is maintained the bandwidth capacity of that link (possibly obtained by an OSPF-TE advertisement), a high water mark for the bandwidth, and the amount of bandwidth which is used up as secondary/backup path. The ELDB also maintains a list called the primary flow list. Every entry in this primary flow list provides information about the flow-id of a primary flow, the amount of bandwidth it has used, and a backup link-ID that serves as a pointer or a reference to the LLDB.

Just like the LLDB, the ELDB too is modified every time RSVP makes a call to the admission controller to create a backup path. The list of outgoing interfaces, used as an argument by RSVP, is used to modify the ELDB. By referring to the ELDB, the admission controller can find out all the primary flows that are present in a primary link, and thus find out the various flows that affect a particular backup link. In other words, the various 'KJ's to determine the summation in equation (1) is obtained.

Both the LLDB and ELDB are distributed databases, and concern only with the calculation of their local interfaces. The admission controller in each node would calculate, with the help of the LLDB and the ELDB, the amount of bandwidth required additionally to support the new secondary path.

In this architecture, admission controller at every backup path creation time, apart from modifying LLDB and ELDB to reflect the latest changes to the network, gets the exact information about all the primary flows across various links in the network, and computes equation (1). If the value computed by equation (1) is lower higher than the backup path bandwidth required, then only the additional bandwidth is reserved. If it is the same or lower, obviously no reservation is required to support the backup path.

Allowing the admission controller (with the help of the two databases LLDB, and ELDB) and the RSVP module in performing the bandwidth calculation for the secondary path, as opposed to OSPF clearly shows considerable performance increase. This is possible because the number of OSPF messages is brought down, also bringing down the memory requirements for OSPF. Besides, the information thus obtained is clearly far more superior to the messages exchanged by OSPF, because the information that is used, is used exactly when required, thus removing the need for flooding and unwanted crank-backs.

This architecture model, would also work well with OSPF-TE, wherein the OSPF is used to figure out traffic engineered paths. This model doesn't preclude the use of OSPF-like protocols, but enhances them. In networks where OSPF-TE is not available, this architecture can still be used, however, one will have to be ready for crank-backs as nodes in the network might have no idea as to when the links in another portion of the network is running out of bandwidth. We proposed a solution, in the absence of TE protocols, to lessen the crank-backs by using a high water mark for the bandwidth, and also including the link capacity in the opaque object carried by RSVP. This however is a different problem. In general, the lack of a TE routing protocol would only end up in few crank-backs, the correctness would still be maintained, and the architecture and model would still hold.

RSVP traditionally uses RRO to record the outgoing interfaces and it is not typically necessary to use an opaque object to record them. However, since in accordance with the present invention, it is necessary to allow RSVP to send a reverse path message and establish a bi-directional flow, RRO's are used to record the router ID's. Use of the opaque object and storage of the information in the LLDB and ELDB enables this function.

Specifically, the process of the present invention includes:
a) the creation of the opaque object;
b) the storage of the data contained in the opaque object in LLDB's and ELDB's for each node in the primary path; and
c) using the data from the LLDB and ELDB to calculate the optimal backup path without having to use OSPF (or any other flooding protocol). In addition to the efficiencies described above, the calculation of such information is far more efficient than using OSPF, in terms of memory, disk, and precious CPU usage.

The following example, referencing FIG. 2, is provided to further explain the present invention. Referring to FIG. 2, once it is determined that the primary path is R1-R2-R3, a path message is sent from R1 to R3 via R2. Once R3 gets this path message, R3 sends back an RESV message via R3-R2-R1, and also another path message (the reverse path message) via R3-R2-R1. Once both the pairs of path and RESV messages are completed, the source node gets the new opaque object (primary path object) and appropriately stores the data in the LLDB and ELDB. It is now necessary for the source node (R1) to identify the available backup paths. Several parallel paths are identified between R1 and R3, and one or more of them will be selected based on the criterion of administrative weight, cost, jitter and delay. For this example, it is assumed that only one such path matches these criteria, and that particular path is R1-R4-R5-R6-R3. The source node, R1, then packs the opaque object in the path message for the backup path and sends it along to the next node in the backup path, node R4, where the information is stored in R4's LLDB and ELDB.

Using the information contained stored in the LLDB and ELDB and the prior art OSPF method, it is possible for the node R4 to determine the least backup bandwidth required to allow creation of a backup link between R1 and R4. The prior art method, whereby the OSPF method was used without the use of the opaque object and without the use of the LLDB and ELDB, required heavy computation and massive use of resources, and the data obtained might be stale. So R4 calculates the right amount of backup bandwidth needed for the R1-R4 segment and sends the opaque object on to the next node in the proposed back up path, R5. Upon receipt of the opaque object by the node, the information contained in the opaque object is stored in the LLDB and ELDB (as appropriate) as described above. This process is repeated along the entire proposed backup path until the destination node, R3, is reached. Node R3, on receiving the path message, sends back an RESV message along R3-R6-R5-R4-R1, and allocates the required calculated bandwidth that it needs. When the RESV message reaches R6, it too allocates the required bandwidth that it calculated when it received the path message. R6 then sends the RESV message to R5, and so on, until it reaches R1.

Assuming there were multiple choices for backup paths, all that is left for node R3 is to send the path message to one particular path among the multiple choices, and calculate the total bandwidth reserved along that path. Once completed for that path, node R3 performs the same process for the remaining paths, and the complete path finally selected is the path that requires the least necessary bandwidth allocation.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of one or more hardware components with which the present invention operates. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for determining a backup bandwidth required to provide shared mesh protection for a primary path in a network, comprising the steps of:
   identifying local data regarding only local interfaces of each node in said primary path and storing said local data in a local links database (LLDB);
   identifying primary link data regarding only links in said primary path that affect the calculation of backup bandwidth of each node in said primary path and storing said primary link data in an external links database (ELDB); and
   determining the backup bandwidth required to provide shared mesh protection for said primary path using only said LLDB and ELDB data.

2. The method of claim 1, wherein said local data comprises:
   bandwidth capacity of each node in said primary path;
   the bandwidth currently being used by each node in said primary path;
   a highwater mark for bandwidth used by each node in said primary path;
   the amount of bandwidth of each node of said primary path that is currently being used as backup bandwidth; and
   a primary links list.

3. The method of claim 2, wherein said primary link data comprises:
   bandwidth capacity of each primary link;
   a highwater mark for bandwidth for bandwidth for each primary link; and
   the amount of bandwidth currently being used as backup by each primary link.

4. The method of claim 3, wherein said primary links list comprises:
   a pointer to said ELDB for each link for which data is stored in said ELDB;
   the number of paths that are affected by each link for which data is stored in said ELDB; and
   the amount of bandwidth consumed by each of said paths.

5. The method of claim 4, wherein said primary path is identified using RSVP.

6. A system for determining a backup bandwidth required to provide shared mesh protection for a primary path in a network, comprising:
   means for identifying local data regarding only local interfaces of each node in said primary path and storing said local data in a local links database (LLDB);
   means for identifying primary link data regarding only links in said primary path that affect the calculation of backup bandwidth of each node in said primary path and storing said primary link data in an external links database (ELDB); and
   means for determining the backup bandwidth required to provide shared mesh protection for said primary path using only said LLDB and ELDB data.

7. The system of claim 6, wherein said local data comprises:
   bandwidth capacity of each node in said primary path;
   the bandwidth currently being used by each node in said primary path;
   a highwater mark for bandwidth used by each node in said primary path;
   the amount of bandwidth of each node of said primary path that is currently being used as backup bandwidth; and
   a primary links list.

8. The system of claim 7, wherein said primary link data comprises:
   bandwidth capacity of each primary link;
   a highwater mark for bandwidth for bandwidth for each primary link; and
   the amount of bandwidth currently being used as backup by each primary link.

9. The system of claim 8, wherein said primary links list comprises:
   a pointer to said ELDB for each link for which data is stored in said ELDB;
   the number of paths that are affected by each link for which data is stored in said ELDB; and
   the amount of bandwidth consumed by each of said paths.

10. The system of claim 9, wherein said primary path is identified using RSVP.

11. A computer program product for determining a backup bandwidth required to provide shared mesh protection for a primary path in a network, the computer program product comprising a computer-readable storage medium having computer-readable program code embodied in the medium, the computer-readable program code comprising:
    computer-readable program code that identifies local data regarding only local interfaces of each node in said primary path and storing said local data in a local links database (LLDB);
    computer-readable program code that identifies primary link data regarding only links in said primary path that affect the calculation of backup bandwidth of each node in said primary path and storing said primary link data in an external links database (ELDB); and
    computer-readable program code that determines the backup bandwidth required to provide shared mesh protection for said primary path using only said LLDB and ELDB data.

12. The computer program product of claim 11, wherein said local data comprises:
    bandwidth capacity of each node in said primary path;
    the bandwidth currently being used by each node in said primary path;
    a highwater mark for bandwidth used by each node in said primary path;
    the amount of bandwidth of each node of said primary path that is currently being used as backup bandwidth; and
    a primary links list.

13. The computer program product of claim 12, wherein said primary link data comprises:
    bandwidth capacity of each primary link;
    a highwater mark for bandwidth for bandwidth for each primary link; and the amount of bandwidth currently being used as backup by each primary link.

14. The computer program product of claim 13, wherein said primary links list comprises:
   a pointer to said ELDB for each link for which data is stored in said ELDB;
   the number of paths that are affected by each link for which data is stored in said ELDB; and
   the amount of bandwidth consumed by each of said paths.

15. The computer program product of claim 14, wherein said primary path is identified using RSVP.

* * * * *